Nov. 20, 1951  E. R. AMBROSE ET AL  2,575,325
HEAT PUMP SYSTEM
Filed Feb. 14, 1948  3 Sheets-Sheet 1
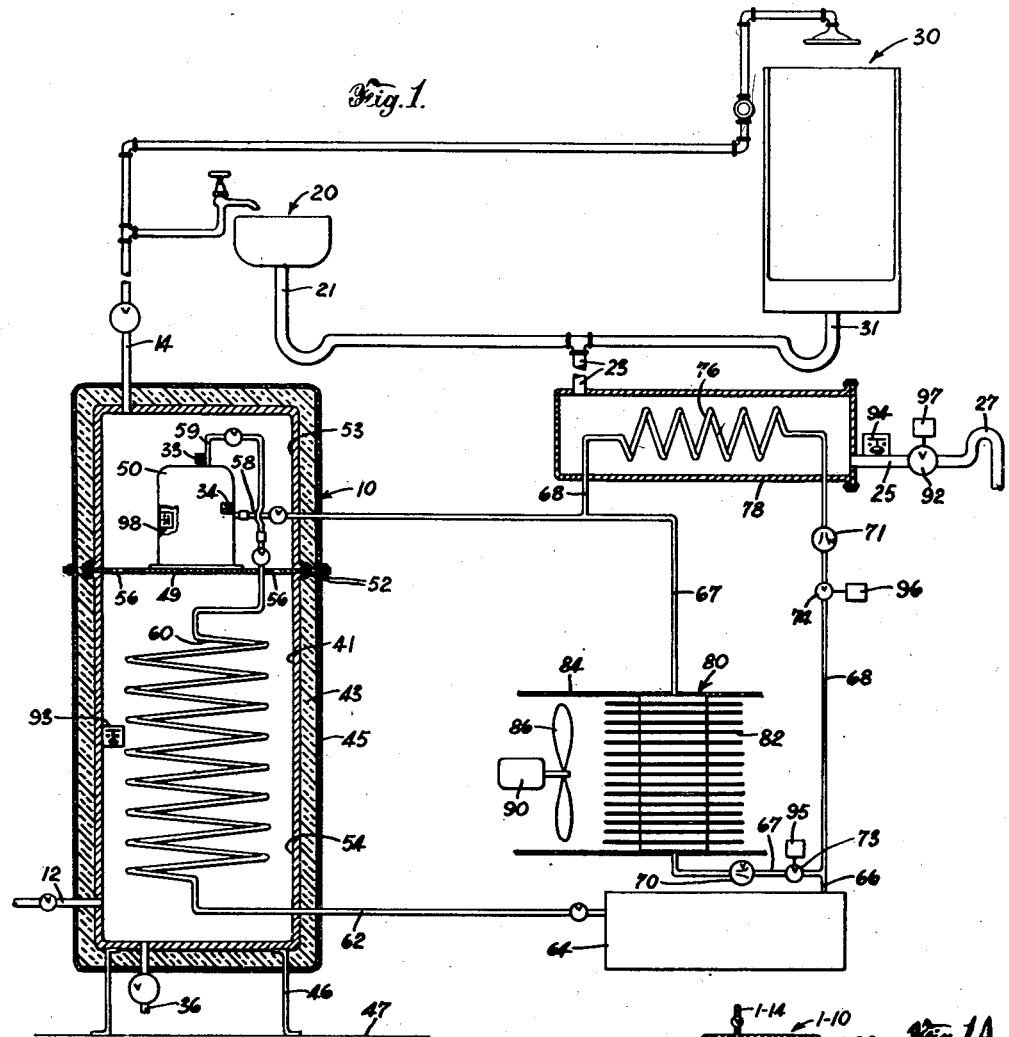
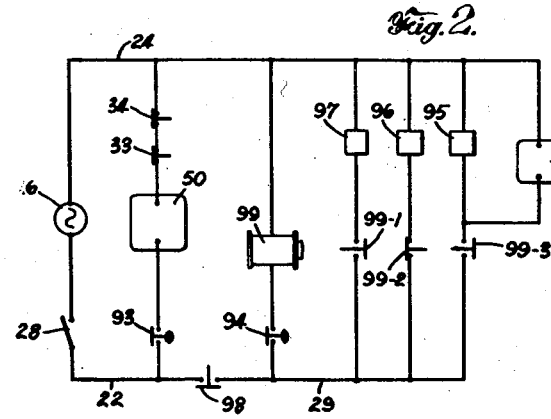
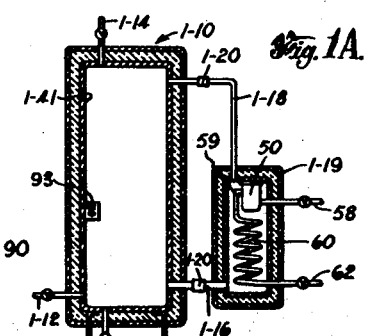
INVENTORS
P. SPORN
E. R. AMBROSE
BY
ATTORNEY

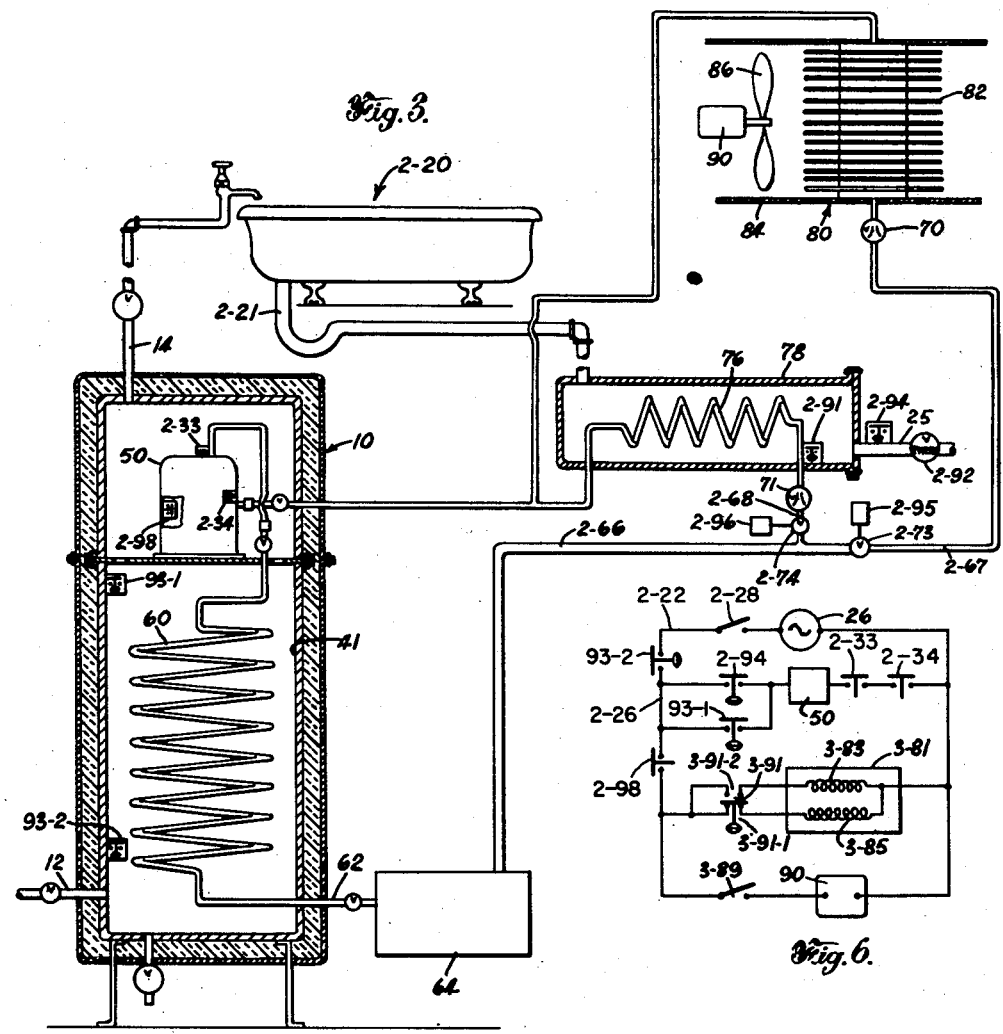
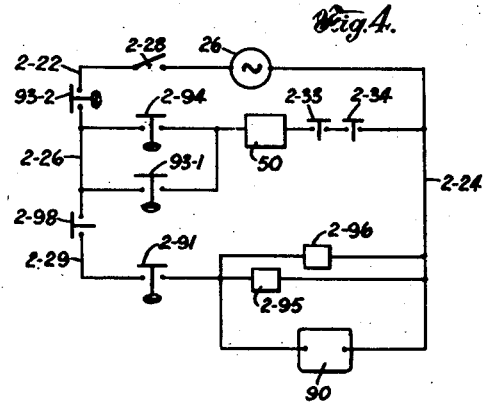
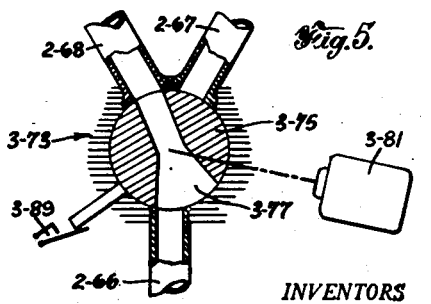

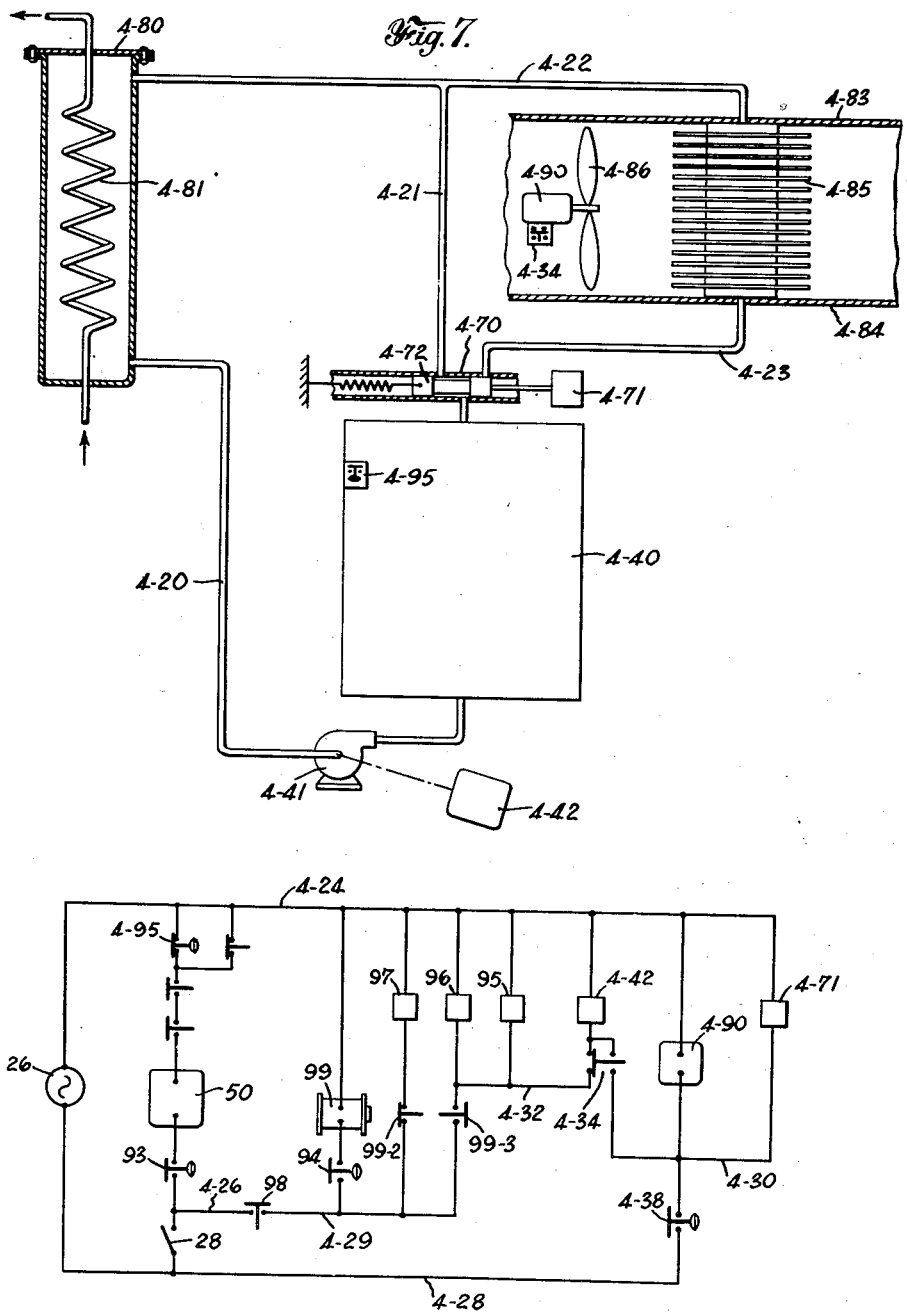

Patented Nov. 20, 1951

2,575,325

UNITED STATES PATENT OFFICE 2,575,325

HEAT PUMP SYSTEM

Eugene Russell Ambrose, Roselle Park, N. J., and Philip Sporn, New York, N. Y., assignors to American Gas and Electric Company, New York, N. Y., a corporation of New York Application February 14, 1948, Serial No. 8,328

14 Claims. (Cl. 62—6)

This invention relates to novel heat pump systems of increased efficiency.

The principal features of the heat pump are well known and center about a combination of compressor, condenser, expansion valve and evaporator. The heat pump elements are used in the conventional refrigerating cycle by passing a gaseous refrigerant through the compressor where its temperature is elevated, rejecting heat from the compressed refrigerant in the condenser where it is liquified, reducing the pressure on the liquified refrigerant by moving it through the expansion valve and permitting it to evaporate in the evaporator where its temperature is reduced and it absorbs heat. When used for heating, a given space or object to be heated is placed in heat exchange relation with the condenser to utilize the heat there rejected during the liquification of the refrigerant. When used for cooling, the space or object to be cooled is placed in heat exchange relation with the evaporator according to the conventional refrigeration technique.

Among the objects of the present invention are novel heat pump systems which are capable of supplying heated water with increased efficiency and decreased cost combining such systems with means for utilizing heat of waste liquids formed in the normal use of the heated water.

Further objects of the invention include a novel heat pump water heater in combination with air conditioning structures.

The foregoing and other objects of the invention will be best understood from the following description of exemplifications thereof, reference being had to the accompanying drawings wherein:

Fig. 1 is a simplified diagrammatic view of the essential elements of a novel heat pump system exemplifying the invention;

Fig. 1-A is a view on a reduced scale of a portion of the heat pump system of Fig. 1 showing a modification thereof;

Fig. 2 is a circuit diagram of a control arrangement for the heat pump system of Fig. 1;

Fig. 3 is a view similar to Fig. 1 of a modified heat pump system exemplifying the invention;

Fig. 4 is a circuit of a control arrangement for the system of Fig. 3;

Fig. 5 is a fragmentary view of a modified type of valve control arrangement for the system.

Fig. 6 is a circuit diagram of the control arrangement of a system of Fig. 3 modified as shown in Fig. 5.

Fig. 7 is a view similar to Fig. 1 of a modified form of a heat pump system exemplifying the invention; and Fig. 8 is a circuit diagram of a control arrangement for the system of Fig. 7.

In conventional constructions for supplying heated water, as for domestic use in homes or the like, the water is heated by the direct conversion of chemical energy in heating fuels, for example, to heat energy. Although heat pump heating is known to be a more efficient and more convenient arrangement inasmuch as it operates by merely raising heat energy from a lower level in the evaporator to a higher level in the condenser and involves no combustion, heat pump systems have not been used to any appreciable extent for supplying heated water. Chief among the reasons for the absence of such convenient and efficient arrangements is the difficulty of obtaining a practical source of heat for the evaporator, and the reduction in efficiency of the system when raising the water temperature to the 140°–150° F. usually required. Ambient air from the standpoint of availability and cheapness offers a most attractive heat source. Unfortunately, however, the possible fluctuations in ambient air temperature combined with the low temperature level of the air usually requires a relatively large evaporator and compressor to satisfy the high heating demand, resulting in an expensive installation operating at low efficiencies. The earth or ground waters are also well known as heat sources, but here again the installation required to infrequently supply large volumes of hot water is not economical. Furthermore, a collateral recirculation of a heat exchange medium is required to interlink the evaporator with the ground or ground water, and in addition to being an expensive installation the collaterally recirculating liquid stands in considerable danger of dropping to low temperature during high demand conditions, thereby resulting in operational difficulties and in reducing the efficiency of the system.

Of course, a hot water heater may be provided with a relatively large hot water tank and a relatively low energy output so that it operates substantially continuously to keep the storage tank filled with hot water and at the same time only requires a low heat intake. Such storage system supply is handicapped by having a low heat recovery rate so that the heated water is not available during any high demand period when slightly more than one storage tankful of heated water is required.

In most systems utilizing heated water, it is practically always discharged to waste before it loses all the heat which it has received. Thus in domestic use, when a member of the household takes a shower, the heated water is sprayed directly on the person and is promptly drained to waste. In the drains the temperature of the waste water is still in the neighborhood of 75° to 95° F. The same is true of hot water used for washing dishes, for example, where even higher drain temperature may prevail.

According to the invention, these waste waters as well as others originating from the heated water are utilized as sources of heat with which a heat pump water heater is very economically used. In this combination the energy supplied to the heat pump is only necessary to raise heat energy from the relatively high level of the drain temperature to the desired hot water level. Less input operating energy is accordingly required for the heat pump, and its cost of operation is considerably decreased.

Fig. 1 in simplified diagrammatic manner shows one form of heat pump system of the invention. In this simplified view many of the details not pertinent to the invention are omitted. Essentially the system includes a water heater 10 for preparing heated water from an intake line 12 and supplying it through valved outlet line 14 for use in conventional equipment such as the sink 20 and shower 30.

The water heater 10, as shown, includes a water container 41 surrounded by insulation 43 and an outer jacket 45, all supported by legs 46 resting on a convenient floor 47. According to the invention, the compressor unit 50 of the heat pump is shown installed within the heated water container 41 as by mounting it on a dividing plate 49 held between the flanges 52 of two flanged generally bell-shaped portions 53, 54 of the container. The dividing plate 49 is perforated, as indicated at 56, to provide interconnection between the portions on either side of it.

The compressor shown is a conventional electrically driven pump compressor having a valved intake line 58 and a valved outflow line 59 into which it delivers a suitable refrigerant fluid at elevated pressure at a relatively elevated temperature. The line 59 leads to a condenser coil 60 which may be located in the lower compartment 54 of the water heater and in which the compressed refrigerant fluid is liquified simultaneously rejecting heat which is absorbed by the water of lower temperature which surrounds the coil 60. From the condenser coil 60 the liquified refrigerant passes through valved connecting line 62 to a storage receptacle 64 having an outlet 66. The outlet 66 of the storage receptacle 64 branches into two parallel circuits including conduits 67 and 68. In each of the conduits 67, 68 is placed an expansion valve 70, 71, respectively, as well as flow control valves 73, 74, respectively.

In the parallel circuit of conduit 68 there is provided an evaporator coil 76 in heat exchange relation with a liquid discharge receiver vessel 78. When the compressed refrigerant passes through expansion valve 71 of conduit 68 its pressure is decreased and it evaporates in an evaporator 76, and the evaporated refrigerant is returned to the compressor suction line 58. In the parallel circuit through conduit 67 an additional refrigerant evaporator structure 80 is provided in effective heat exchange relation with a different medium such as ambient air. The evaporator 80 is shown as including a heavily finned refrigerant passageway in which the fins 82 are located in an air duct 84 provided with air impelling means, such as the fan 86, driven by electric motor 90. When the liquid refrigerant is passed through expansion valve 70 in parallel conduit 67 its pressure is decreased, and it evaporates in evaporator 80 after which the evaporated refrigerant is also returned to the compressor suction line 58.

The liquid receiver 78, through which evaporator coil 76 passes, is connected in the drain line of equipment which utilizes the hot water. As indicated, the sink 20 and the shower 30 which utilizes hot water may have trapped drains 21 and 31, respectively, which unite into a common drain 23 leading to the hot liquid discharge receiver 78. Drains from other fixtures likely to use heated water are also connected to the receiver 78 in a similar manner. The waste outlet 25 provided for the liquid discharge receiver 78 is connected through a valve 92 and trap 27 to the sewer or other discharge outlet.

Thermo-responsive controls for the apparatus of Fig. 1 are provided by thermostat 93 in a water compartment of the heater 10 and thermostat 94 in the outflow line of the liquid discharge receiver 78. The refrigerant flow control valves 73, 74 are shown as electrically controlled by the valve operators 95, 96 which may be of the conventional solenoid type. The liquid discharge control valve 92 is also electrically operated through a similar valve operator 97. The compressor may also include an auxiliary switching arrangement shown at 98 for automatically interconnecting the electrically operated components at the proper time. Safety features are also provided in the form of pressure responsive switches 33, 34 in the compressor output line 59 and suction line 58. A conventional valved drain 36 for the water compartment of the water heater 10 is also shown.

In the apparatus of Fig. 1, the compressor 50 is utilized to heat water as it delivers compressed refrigerant to the outlet pressure line 59. A feature of the invention shown is the incorporation of the compressor 50 in the heated water compartment so that all of the relative high temperature energy dissipated by the compressor including the energizing current or so-called copper losses of the compressor motor and the eddy current or so-called iron losses of the magnetic components of the compressor motor, as well as the thermodynamic energy liberated through the increase in pressure on the refrigerant, is used for heating the water in the water compartment 41 from which it is maintained available for use through any of the conventional heated water using apparatuses. Using the losses of the compressor, in this manner, enables the heating of the water in upper portion of the tank to a temperature higher than that in the lower portion without increasing the compressor work, thereby improving the efficiency of the system. After passage through the condenser coil 60, the condensed refrigerant may be passed through either of the parallel circuits 67, 68. In the normal use of heated water it is discharged to waste without giving up all of its available heat content, as explained above, so that the drain liquid passing into liquid discharge receiver 78 contains a substantial residual heat content. Accordingly, the refrigerant cycle is generally completed by passing the liquified refrigerant through parallel conduit 68 and evaporator 76 so that as it evaporates it absorbs the residual heat contents of liquid in receiver 78, before it returns at lower temperature and pressure for additional recycling through the compressor. The preparation of heated water in accordance with this process is highly efficient and is extremely effective and desirable for installations such as those described above. Under some conditions, however, especially where the water supplied to the heater through inlet 12 is extremely cold, or in installations where the incidental cooling of the refrigerant in the portion of the recycling path from the outlet of condenser 60 to the inlet of evaporator 76 is only to a slight and insignificant extent, enough heat may not be available in the liquid discharge receiver 78 so that additional heat must be supplied to the heat pump system. For these purposes the air conduit 67 supplies additional heat to the conduit path 67 parallel to the recycling conduit 68. In this way a portion of the refrigerant may be passed through the auxiliary path 67 containing evaporator 80 to thereby abstract an additional amount of heat from the ambient air to supplement the heat supplied to the principal evaporator 76.

In many cases, however, the passage of the refrigerant from the relatively hot water compartment 41 through the external conduits, including conduit 62 and container 64, will permit it to appreciably cool and approach ambient or room temperature so that the heat absorbed in evaporation is appreciably less than the thermodynamic heat transferred to the water in the water heater. In this type of apparatus the heat pump of the invention will operate efficiently without the auxiliary heat source 80. The cooling of the liquified refrigerant to room temperature before passage through the evaporator may be improved by increasing the heat exchange characteristics between the ambient air and the conduits 62, 66 leading to and from the storage container 64 as well as the storage container itself. Thus, for example, these conduits may be coiled or finned to provide additional heat exchange surface.

The auxiliary heat source 80 may be of relatively small size being generally required to only supplement the heat available in water discharge receiver 78. As a precautionary measure, however, the evaporator 80 may be designed so that for short periods of time it can supply all the heat necessary for satisfactory operation of the heat pump system of the invention.

Fig. 2 is a circuit diagram of a control arrangement by which the system of the invention may be automatically operated to provide heated water when necessary and to suitably direct the absorption of heat. The controls include the conventional oppositely polarized leads 22, 24 of a source of electrical energy such as the regular 60 cycle alternating current supply represented at 26. An "on-off" switch 28 may be inserted in the line for placing the apparatus in automatic operation when desired. Across the line 22, 24 is connected the motor of compressor 50 through the contacts of pressure switches 33, 34. The remaining electrically operated devices are connected to the power supply line 22, 24 through the auxiliary switch contacts 98 of the compressor 50. The switch 98 is arranged so that when the compressor is not in operation the contacts 98 are open and no energy is supplied to the remaining components of the control circuit.

Closing of the contacts of auxiliary switch 98 prepares a circuit across the leads 29, 24 for energizing the windings of a relay 99, switch operators 97, 96, 95 and fan motor 90. The thermostat 94 is placed in series with the windings of relay 99 across the circuit 29, 24. The relay has three sets of contacts 99—1, 99—2 and 99—3, respectively, connected in series with the switch operators 97, 96 and 95 across the leads 29, 24. The fan motor 90 is placed in parallel with the switch operator 95.

Thermostat 93 is set so that when the temperature of the water compartment 41 adjacent this thermostat falls below the critical value for which it is set, as by the drawing off of heated water permitting unheated water to flow in, the thermostat contacts close energizing the compressor. The safety switches 33, 34 are normally closed but are arranged to open the compressor energizing circuit when the pressure at the compressor suction inlet falls too low or that at its outlet rises unduly. Thermostat 94 is adjusted so that when the liquid in the waste conduit 25 gets too cold the thermostat contacts close the energizing circuit for the windings of relay 99. When energized, the relay is arranged to close the circuits through normally open contacts 99—1, 99—3 and to open the circuit through normally closed contacts 99—2. The thermostat 94 may be set at a convenient low temperature such as 50° to 45° F. or lower so that valve operator 97 is actuated when the liquid in the discharge line 25 is at a temperature lower than that for which the thermostat 94 is set, and the valve operators 96, 95 together with the fan motor 90 are actuated when this discharge liquid is at a lower temperature. The valve operators 97, 96, 95 may be of the solenoid type biased toward the valve closing position, as by a spring, and moved to the valve opening position when the windings of the solenoid are energized.

In the arrangement described above, the apparatus when set for automatic operation, by closing of "on-off" switch 28, will be inoperative as long as thermostat 93 indicates that no additional heating is necessary. When this thermostat calls for heat as, for example, when heated water is withdrawn through supply outlet 14 for use in apparatuses of the type shown at 20 and 30, the heat pump system will be placed in operation. Because of the time lag generally present between the withdrawal of heated water and operation of the thermostat, by the time the heat pump begins to operate the drain thermostat 94 will generally have its circuit contacts open because of the arrival of draining liquid in the liquid discharge receiver 78. Even without this lag the liquid contents of the drain will generally be above the low temperature setting of thermostat 94 if these liquids have been permitted to stand for some time and approach room temperature. Accordingly, when the heat pump operation commences, valves 92 and 73 will be closed because the normally open contacts 99—1, 99—3 keep the operators 97, 95 of these valves de-energized. Valve 74 will be correspondingly held open by its operator 96 energized through the normally closed contacts 99—2. The heat pump system will continue to transfer heat from the contents of the liquid discharge receiver 78 through the contents of the water compartment 41 generally until all the heat required in the water heater 10 has been supplied. In those instances when not enough heat is available in the discharge receiver 78 either because the water to be heated is extremely cold and near freezing, or because the contents of the receiver have been mixed with cold water, thermostat 94 will close its contacts during the operation of the heat pump. When this happens relay 99 is energized causing valve 74 to be closed and opening valves 73 and 92, at the same time energizing air impeller 90. The refrigerant cycle is thereby shifted from the evaporator 76 to the evaporator 80 while the contents of receiver 78 are permitted to drain to waste. Heat continues to be supplied to the water heater as called for by thermostat 93 by transfer from the ambient air in contact with the cooling fins 82 of the evaporator 80. When the cooled contents of discharge receiver 78 have been replaced by warmer liquid, as by the draining of additional heated water that has been used, thermostat 94 will again open its contacts, closing valves 92 and 73, reopening valve 74 to again establish the highly efficient heat pump cycle through evaporator 76.

The lag between the withdrawal of heated water from the water heater 10 and the commencement of the heating action may be eliminated so that under some conditions of operation the heat pump action will begin with a short cycle through the evaporator 80 before the contents of receiver 78 have reached suitable operating temperature, and the heat supply is taken over by principal evaporator 76. However, conventional hot water heaters and thermostats generally include an overlap which supplies the lag described above. The gradual dissipation of heat throughout the contents of the water compartment 41 usually produces a heated water column extending to below the level of thermostat 93 and the thermostat itself will only begin to call for additional heat when cooled at least one or two degrees or even more below the temperature at which it acts to stop further heating.

The liquid discharge line of the apparatus shown in Fig. 1 may have an additional safety outlet to waste ahead of the valve 92 so that discharged liquid cannot accumulate to an extent which would interfere with the drainage system. Thus, an overflow outlet (not shown) may be provided in conduit 25 having a trap extending to a level corresponding to the desired maximum filling of receiver 78, accumulation of discharged liquid in excess of this amount causing overflow to waste.

The liquid discharge receiver 78 may be inserted in a separate drainage system for receiving the discharges of those apparatuses utilizing the heated water, and may be entirely separate from even the cold water draining system. Alternatively, a common drainage system may be utilized incorporating the hold-back receiver 78.

An added feature of the construction of the invention is the use of the auxiliary evaporator 80 to provide cooling where desired. This evaporator may be arranged so as to cool the ambient air for air conditioning purposes or for refrigeration. In this manner a small home, for example, may have a heat pump hot water supply unit similar to that shown in Fig. 1 with an arrangement for confining the heat pump cycle to the evaporator 80 during those periods when air conditioning or refrigeration is desired. An additional air or refrigerator thermostat may be connected for closing valve 74 and opening valve 73 when additional air or refrigerator cooling is needed, and supervene over the control action of thermostat 94. Such a modified apparatus may also include an additional arrangement incorporating the control action of thermostat 93 for directly discharging some of the heated water from the water heater 10 to waste. In such a construction when it is desired to prolong the cooling beyond the period required for providing the necessary amount of adequately heated water, the heat pump action will continue raising the temperature of the water stored in compartment 41 above that set by the thermostat 93. Additional heat pump action may either be prevented by a second thermostat or may be arranged to discharge some of the heated water to waste and make room for additional heat to be delivered by the heat pump condenser.

The refrigeration available through an auxiliary evaporator 80 of relatively small size is sufficient of itself to provide all the cooling necessary for operating utilities such as domestic types of deep freezers in which a storage compartment of considerable size may easily be maintained at a suitable low storage temperature inasmuch as the storage compartment is only infrequently opened and is well insulated.

The system of the invention may have an additional safety feature incorporated in the form of a low temperature thermostat within the discharge chamber 78 and connected in series in the energizing circuit of compressor 50 for preventing heat pump action when the contents of the chamber are in danger of freezing.

Other modifications may be made in accordance with the invention. For example, the compressor 50 need not be incorporated within the water heater as shown in Fig. 1, but may be externally mounted in a separate tank. In this form the separate compressor-containing tank may include all the water heating elements so that it is simply connected with a heated water container 41, such as shown in Fig. 1. The container 41 is thereby used as a relatively large storage reservoir while the separate heating tank may be relatively small and supplied as a unit for attachment to a reservoir or water container of standard type which may be part of a previous conventional installation.

Fig. 1-A shows one form of such modification of the invention. A heated water tank 1—10 having an insulated container 1—41 provided with water supply and withdrawal lines 1—12, 1—14 is connected as by couplings 1—20 through a pair of by-pass conduits 1—16, 1—18 with a water heating tank 1—19. The by-pass conduits 1—16, 1—18 are vertically spaced so that during a heating operation, water moves from the cooler lower portions of the container 1—41 through the tank 1—19 where it is heated and returned to the upper hotter portions of the container. The heating elements in the tank 1—19 include a compressor 50 and condensing coil 60 connected to the compressor discharge line 59, similar to the arrangement of Fig. 1. The suction line 58 of the compressor and the outlet line 62 of the condensing coil are inserted in the heat pump system as shown in Fig. 1, for example, to complete the apparatus.

The construction of Fig. 1-A may be under the control of a water-responsive thermostat 93 in the container 1—41 or tank 1—19. The heating tank may be disposed at a level below the top of the container 1—41 so that the heating elements are transferring heat to cooler water, thereby increasing the heating efficiency and providing a more uniformly heated water. Movement of the water through the heater is arranged to take place under the impelling action of connection currents.

The compressor of the heat pump water heater may be mounted out of contact with the water if the water heating action of its frictional heat losses as well as its copper and iron losses are not desired. In such an arrangement the compressor discharge line is preferably directly led into the upper zone of a heated water container and should be as short as possible. The compressor may be incorporated with the fan 90 as a single unit having an air impeller and a compressor pump connected for operation by a single power drive, such as an electric motor. Moving a cooling stream of air over the motor as well as the compressor, the air impeller may take the place of the cooling arrangements normally provided in electric motors and also use the heat thus dissipated to help supply the auxiliary evaporator 80.

Fig. 3 shows another embodiment of the invention. This construction is arranged for providing the efficient and economical water heating system described above even in those situations where a considerable time elapses between the withdrawal of heated water for use and the discharge of the used heated water to drain. For example, the use of a conventional bathtub for bathing generally involves the drawing of a large volume of water into the bathtub followed by the actual bathing operation which may extend over a period of time of the order of a half hour before the water is drained. Similar time delays occur in the use of such water users as clothes washing machines. These characteristics appear to necessitate the provision of an auxiliary heat source large enough to handle such demands. According to the invention, however, such undue size of the auxiliary heat source is dispensed with by controlling the heat pump heating primarily by the availability of heat in the liquid drain receiver.

Fig. 3 shows one arrangement for accomplishing these results and still providing efficient and inexpensive water heating. The heat pump system of this figure may be similar to that shown in Figures 1 and 2 including a water heater 10, compressor 50, condenser 60, refrigerant container 64, principal evaporator 76 and auxiliary evaporator 80. The water heater, in addition to the regular components for introducing, storing and heating the water and for supplying the heated water to apparatus such as the bathtub, contains a modified heating control arrangement. The waste valve 2—92 from the liquid discharge receiver 78 is shown as of the self-energized thermostatic type which automatically opens when the liquid drained through trapped drain connection 2—21 and present in the discharge conduit 25 is below a desired low temperature at which no further heat is to be withdrawn from it. A thermostat 2—94 adjacent the discharge conduit 25 is arranged to close its circuit contacts when the liquid in the receiver is at a predetermined temperature at which it can provide an appreciable heat supply. An additional thermostat 2—91 in the discharge container and adjacent the coldest portions of the evaporator 76 is arranged to close a set of contacts when the temperature of the contacting liquid reaches a predetermined low value at which freezing is likely, and to keep these contacts open when the temperature of the liquid is higher. In this construction the refrigerant container outlet line 2—66 branches into the parallel evaporator circuits 2—67, 2—68 including the expansion valves 70, 71, respectively, and the electrically operated flow control valves 2—73, 2—74, respectively, as in the construction of Fig. 1. The heated water compartment contains two thermostats 93—1, 93—2 at spaced levels for closing different operating circuits.

Fig. 4 shows one form of automatic control circuit for obtaining the desired economical and efficient operation. A pair of leads 2—22, 2—24 from the power source 26 and containing an "on-off" switch control, such as the switch 2—28, is connected through the contacts of thermostat 93—2 to energize the heat pump actuating line conductors 2—26, 2—24. The thermostat 93—2 is arranged to open its circuit contacts when no further heat is to be supplied to the water heater, as when substantially all the water it contains is in the desired heated condition, and to keep its contacts closed at all other times. Across the conductors 2—26, 2—24 the compressor 50 is arranged to be connected through either the contacts of thermostat 93—1 or 2—94. The compressor high pressure and low pressure safety switches 2—33, 2—34 are placed in series with the compressor in the manner shown in Fig. 2. Auxiliary switch contacts 2—98 responsive to operation of the compressor establish a further energizing circuit 2—28, 2—24 across which the contacts of thermostat 2—91 connect the valve operators 2—95, 2—96 as well as the blower motor 90. Valve operator 2—96 may be biased to the valve opening position and solenoid actuated to the valve closing position while the operator 2—95 is biased to the valve closing position and solenoid actuated to the valve opening position.

Closing of "on-off" switch 2—28 places the apparatus in automatically operating condition. When thermostat 2—94 shows that heat is available in the liquid discharge receiver, the compressor is energized provided that thermostat 93—2 indicates further heating can be accommodated. When the heat pump is operating and the compressor is running, the closed contacts of auxiliary switch 2—98 provide a power connection for shifting the refrigerant flow from one of the parallel paths 2—67, 2—68 to the other or vice versa under the control of thermostat 2—91. When the contacts of thermostat 2—91 are open, as shown, indicating that the contents of liquid receiver 78 are not being cooled too rapidly, valve 2—74 is kept open by its operator while valve 2—73 is kept closed so that heat continues to be supplied to the refrigerant through evaporator 76. At the same time the fan motor 90 is not energized. When the liquid contents of receiver 78 are cooled too rapidly, thermostat 2—91 closes its contacts thereby shifting the refrigerant flow to the evaporator 80 and starting the fan motor 90. This relieves the contents of receiver 78 from the cooling action until more heat becomes available at the thermostat 2—91 as by the diffusion of residual heat from other parts of the receiver or by influx of more drain liquid from the bathtub 2—20. At such time the contacts of thermostat 2—91 are again opened and further heat pump action takes place through the principal evaporator 76.

The apparatus of Figs. 3 and 4 is accordingly capable of supplying heated water in large quantities without replenishment of the heat until it becomes available at the discharge receiver 78. Heat pump action is then initiated and automatically controlled so that a too rapid withdrawal of heat from the receiver 78 will not interrupt the heating action but will merely decrease the rate of cooling of the receiver contents to suit the heating requirements.

The additional thermostat 93—1 is arranged so that it may also initiate the heat pump action when heated water is drawn off in such quantity as to severely limit its availability, as when several heated water utilizing apparatuses are used at about the same time. This auxiliary heating operation assures the presence of some heated water in the heated water storage compartment at all times. The auxiliary thermostat 93—1 may, however, be omitted in those constructions having a heated water storage compartment 41 large enough to more than fill the heated water delaying apparatuses, such as the bathtub 2—20, and to leave some additional amount in reserve. Any excessive withdrawal of heated water large enough to tap the reserve amount can be relied on to also promptly deliver some used heated water to the discharge receiver 78 and automatically start the heating cycle to maintain the reserve.

The liquids discharged from the heated water using apparatuses provide sufficient heating action to heat substantially all the water in compartment 41 between the reserve amount and the full level at which the thermostat 93—2 is located. Thermostat 2—94 and the liquid waste lines may, if desired, be so arranged and set that some amount of water heating is provided even when unheated water is drained to waste so that the numerous drawings of water during the day provide a sufficient extra heat inflow to the water heater 10 to assure that it is kept substantially filled.

The self-energized waste valve 2—92 may be of the type that automatically adjusts the waste discharge flow over a range of flow rates depending upon the temperature of the liquid in the conduit. When the liquid is cold enough, the discharge opening is widest and flow is at a maximum. As the liquid temperature increases, the opening closes more and more delaying the outflow somewhat to enable abstraction of heat without the danger of freezing. At a temperature a few degrees higher, where the maximum rate of heat abstraction by the evaporator 76 does not remove all the available heat from the receiver contents unless they move through quite slowly, the valve 2—92 may substantially close the discharge opening. This discharge valve may be eliminated by providing a constant outflow opening and so arranging the evaporator 76 in the receiver that at the maximum outflow rate the evaporator is capable of withdrawing substantially all the available heat desired.

The self-energized valve 2—92, shown in the construction of Fig. 2, may also be substituted for the similar valve 92 in the form of the invention shown in Fig. 1.

Figs. 5 and 6 show a still further modification of a heat pump water heater according to the invention. According to this phase of the invention the refrigerant flow control is arranged so that it is not abruptly shifted from one evaporator to another, but may also be adjusted to intermediate flow conditions in which part of the refrigerant moves simultaneously through both evaporators. Fig. 5 shows one form of such flow control arrangement. As shown, the refrigerant conduit 2—66 leading to the evaporators, as in Fig. 3, is connected to the two evaporator circuits 2—67, 2—68 through the branching valve 3—73. This valve includes a movable valve body 3—75 having a passageway 3—77 rotatable in a valve housing 3—79 and providing communication between the conduit 2—66 and either or both of the conduits 2—67, 2—68. By rotation of the valve body 3—75 to the extreme counterclockwise position, in which it is shown in the figure, the passageway only connects the evaporator circuit 2—68 with the refrigerant supply line 2—66. Upon rotation in clockwise direction the valve body moves through positions in which it permits more and more of the refrigerant flow through conduit 2—67 and the auxiliary evaporator, restricting the flow through conduit 2—67, until in the extreme clockwise position, all the flow is restricted to the auxiliary evaporator circuit 2—67. The valve 3—73 may be electrically operated as by a reversible motor connected for rotating the valve body 3—75 in either direction.

Fig. 6 shows one form of automatic control circuit of the invention for use with the branching valve arrangement of Fig. 5 in the heat pump water heater otherwise similar to that shown in Fig. 3. The circuit elements and connections are similar to those shown in Figs. 2 and 4 except that instead of the thermostat 2—91 the refrigerant branching thermostat 3—91 is substituted and the fan motor 90 is differently connected. The branching thermostat 3—91 is provided with two sets of contacts 3—91—1 and 3—91—2, and arranged so that it responds to a predetermined low temperature of the surrounding medium to close only one set of contacts, such as the set 3—91—1, and responds to a higher temperature to open the contacts 3—91—1 and close the contacts 3—91—2. These sets of contacts are arranged to separately energize the valve motor 3—81 and cause the motor to rotate in opposite directions by means of the reversing windings 3—83, 3—85. The fan motor 90 is connected so that it is energized when the heat pump is operating and the branching valve is set for directing refrigerant flow through auxiliary evaporator 80, and is de-energized when this valve cuts off this flow or limits it to a degree which does not require the impelling function of the fan. In the form shown in Fig. 5, the valve operator is arranged to move an arm 3—87 so located with respect to a fan motor controlling switch 3—89 that when the valve reaches the desired limiting position, the fan motor energizing circuit automatically opens. The valve operator 3—81 may also include limit switches to prevent the energization of the motor in either direction after the valve body 3—75 reaches the limit of movement in that direction, as is well known.

Other forms of branching valves may also be used in the system of the invention as, for example, one with a slidable valve body having a passageway establishing communication between suitably spaced ports in a slide housing.

The branching valve form of heat pump system enables the operation of the heat pump with the refrigerant flow automatically proportioned between the two evaporators for abstracting the maximum current of heat from the drain liquids without requiring frequent shifting of the entire flow circuit. Valve action is thereby minimized, less operating power is required and operating noises are considerably reduced. Antihunting arrangements may be incorporated to further diminish the frequency of valve operation, as is well known.

Fig. 7 shows in simplified diagrammatic form the essential elements of a heat pump construction exemplifying a different phase of the invention. This figure shows an evaporator unit 4—80 including an evaporator coil 4—81 through which refrigerant is passed, as shown by the arrows, and which may be an auxiliary evaporator connected in the heat pump circuit, as, for example, the constructions of Figs. 1 and 3 either parallel to or in series with the evaporator elements 76, 82. The additional cooling energy available at the evaporator may be stored and utilized when desired to effect a desired cooling action at selected intervals. In the form shown, the evaporator 4—80 includes a coolant chamber around the coil 4—81 forming part of a cooling circuit including a reservoir or storage tank 4—40 and connecting conduits 4—20, 4—22. The circuit may contain a suitable heat exchange medium, such as water, which may be stored in the tank 4—40 and recirculated into heat exchange contact with the cooling coils 4—81 when the evaporator 4—80 is being used to supply heat to the heat pump. In the figure a circulating pump is shown at 4—41 driven by a pump operator, such as electric motor 4—42. The cooling circuit is shown as including a parallel conduit path 4—23 to the conduit 4—22 connected in the circuit to the tank 4—40 through a by-pass valve 4—70 having a valve operator 4—71 which may be similar to those shown above. For supplying the desired cooling action there is inserted in the parallel conduit 4—23 a cooler, such as air cooler 4—83, having a finned heat exchange passage 4—85 in an air duct 4—84 through which air is moved by the impeller 4—86 actuated by the motor 4—90.

A storage tank 4—40 having a capacity sufficient for the desired cooling may be thermally insulated from any warm surroundings, as by being buried in the earth, to improve its storage efficiency. By this arrangement, advantage may be taken of the lower temperatures prevailing under the ground level and thereby make available cooling energy in excess to that furnished by the evaporator 4—80. For such purposes, the cooling storage container 4—40 may be provided with a relatively large surface for better heat exchange contact with the cool earth. One highly effective form of heat exchange reservoir is shown in the copending application by Sporn and Ambrose, Serial No. 775,280, filed September 20, 1947, now Patent No. 2,513,373 granted July 4, 1950. A regulating device, such as the thermostat 4—85 in the storage tank, is arranged to prevent excessive cooling of coolant liquid to guard against deleterious effect, such as the possibility of freezing.

The by-pass valve 4—70 is shown as including a movable body 4—72 and arranged so that it can be moved from the position, shown, in which it interconnects the storage tank with the evaporator intake conduit 4—22 directly through by-pass connector 4—21 and prevents movement of coolant through the cooler 4—83. The valve may be actuated to an operated position, as by being moved to the right for directing the coolant flow through the cooler 4—83 and blocking off by-pass conduit 4—21. The valve may be biased so as to be held in one of these positions, as, for example, the by-passing position shown, and the valve operator 4—71 arranged to bring the valve into the other position when the operator is energized. The air impeller cooperating with the cooler 4—83 is shown as having a set of auxiliary contacts 4—84 by which the collateral cooling elements are energized when the impeller is actuated. For the efficient transfer of cooling energy from the evaporator coils 4—81 to the coolant, the recirculation path may be arranged to include countercurrent flow of the coolant in the evaporator 4—80 with respect to the refrigerant flow in the evaporator coils 4—81.

Fig. 8 shows one type of circuit arrangement by which the construction of Fig. 7 may be operated as part of the heat pump heater of Fig. 1. Oppositely polarized electric current conductors 4—24, 4—28 fed by energy source 26 establish heat pump operation through "on-off" switch 28. Heat pump compressor 50 in series with the heat supply controlling thermostat 93, and a set of safety contacts is connected across line 4—24 and the heat pump energizing line 4—26 and is energized under the control "on-off" switch 28. Auxiliary switch 98 automatically closed by operation of the compressor 50 establishes an additional energizing circuit to lead 4—29 for actuating the heat pump valve operators 97, 96, 95 and the valve controlling selector relay 99 through the circuit selecting relay 94. These portions of the circuit are very similar to those shown in the construction of Fig. 2 and have the same function except that the relay contacts are simplified in Fig. 8 by the elimination of the contacts 99—1. All the components actuated when the selector relay 99 is energized are shown in the instant figure as connected across the common return conductor 4—24 and a separately energized conductor 4—32 by a single set of relay contacts 99—3. Across these conductors is also connected the coolant recirculator motor 4—42 in series with auxiliary contacts 4—34, shown in the form of a double-throw switch.

Cooling action is provided under the controlling action of cooling switch 4—38 establishing an energizing connection from conductor 4—28 to a cooling bus 4—30. Between the bus 4—30 and the common return 4—24 are connected the air impelling motor 4—90 and the by-pass switch operator 4—71. An additional set of contacts of the double-throw switch 4—34 also connects cooling bus 4—30 to the coolant circulating motor 4—42, as shown. The coolant storage thermostat 4—95 is also shown as included as one of the heat pump safety contacts for disabling the heat pump compressor 50 when the stored coolant is too cold.

The form of the invention described above enables storage of the cooling energy accumulated during the day by operation of the heat pump water heater so that at the desired intervals an adequate amount of highly effective cooling action is available. Thus, the coolant thermostat 4—95 which may be set for temperatures of the order of 50° F. or below, when used with a medium sized storage tank 4—40, is effective for cooling a relatively large sized room for several hours. The cooling control thermostat may be coupled with a timer arrangement for assuring that the limited cooling action is available only during selected periods and is not supplied at other times. A separate manually controlled "on-off" switch may also be arranged for initiating cooling action in addition to, or in place of, the thermostat 4-38.

The heating action under the control of switch 28 of the arrangement of Figs. 7 and 8 establishes coolant recirculation through motor operator 4—42 whenever insufficient heat is available at the primary evaporator in the waste liquid receiver. For such operation the double-throw switch 4—34 may be in the position shown in Fig. 8 where it connects the conductor 4—32 with the operator 4—42. When the apparatus is providing the desired cooling through cooler 4—83, the operation of air impeller 4—90 would bring the switch 4—34 to its other throw position, thereby switching the energizing connection between circulator motor 4—42 from the conductor 4—32 to the cooling bus 4—30. By this arrangement, cooler 4—83 may be operated whether or not the heat pump is delivering heat to the container 41 of the construction of Fig. 1. During such combined heating and cooling action the flow directing valve 4—70 is held in its operated position in which the coolant recirculation flow path is through the cooler 4—83, evaporator 4—80 and storage tank 4—40.

The form of the invention shown in Figs. 7 and 8 may be modified as by eliminating the coolant flow control valve 4—70 together with by-pass conduit 4—21. This greatly simplifies the construction and does not appreciably lower the efficiency of the system because the heat exchange action of the cooler 4—83 is very small and is negligible when air is not impelled through it. Accordingly, a simple recirculation path may be used for both storing and delivering cooling energy by merely stopping or starting the air impeller 4—86.

Further modifications of the invention include the arrangement of coolant thermostat 4—95 so that it only prevents operation of the heat pump heater when additional heat energy is supplied by the evaporator 4—80. Thus, the thermostat 4—95 may be connected for opening the energizing circuit of compressor 50 only when the refrigerant flow control valves direct refrigerant through the coolant supply evaporator, such as the secondary evaporator 4—80. One simple arrangement for obtaining this result is by placing an additional set of contacts 99—3 of relay 99 in parallel with the contacts of coolant thermostat 4—95, the additional relay contacts being arranged for opening the parallel compressor control circuit when the relay 4—99 is de-energized. This form of the invention is highly suited for use with a heat pump system of the type shown in Figs. 3 and 5.

The phase of the invention involving the combination of the cooling storage container 4—40 as a part of a heat exchange reservoir of the type described in the co-pending application by the present applicants, Serial No. 775,280, filed September 20, 1947, dealing with placing of the heat exchange reservoir under the ground level, is fully explained in the aforesaid prior application, the contents of which are hereby made part hereof.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

We claim

1. In a heat pump system for supplying heated water: a water heater including a container connected to a water supply for holding heated water; an apparatus having heated water inlet means connected to the water heater for utilizing the heated water and having a liquid discharge arrangement through which the water is discharged after use; a refrigerant circulating system comprising a fluid compressor means, fluid condenser means, fluid pressure reducing means and fluid evaporator means serially connected into an endless fluid circulating system arranged to pass the refrigerant fluid successively through said compressor means, said condenser means, said pressure reducing means, and said evaporator means and to return said fluid back to said compressor means; said compressor means operating to compress the fluid passing therethrough and including a compressor mounted in heat exchange relation with the water of said container for supplying thereto heat produced by the operation of said compressor means; said condenser means including a condenser structure mounted in heat exchange with the water in said container for causing compressed fluid passing therethrough to liquify and deliver heat to the water of said container; said pressure reducing means being operative to reduce the pressure of compressed fluid passing therethrough; said evaporator means including an evaporator structure in heat exchange relation with the liquid of said discharge arrangement for permitting fluid passing through said evaporator structure to evaporate and absorb heat from the liquid discharged after use of the hot water and utilizing residual heat content of this liquid; said compressor being mounted in heat exchange relation to the water in said container for supplying thereto heat produced by the operation of said compressor; and means responsive to the temperature of the water in said container for setting said compressor into operation when the water temperature is below a predetermined level and for stopping the operation of said compressor when the water temperature is above a predetermined level.

2. In a heat pump system for automatically supplying heated water: a water heater including a container connected to a water supply for holding heated water; an apparatus having heated water inlet means connected to the water heater for utilizing the heated water and having a liquid discharge arrangement through which the water is discharged after use; a refrigerant fluid circulating system comprising a compressor having an inlet and an outlet for increasing the pressure on a refrigerant fluid drawn in at the inlet and discharged at the outlet, said water heater including a condenser having an outlet connected to the compressor outlet in heat exchange with the water heater container for receiving and passing into the outlet the compressed fluid permitting it to liquify and deliver heat energy to the water in the container; said condenser having an outflow connection, an automatic pressure reducing means in said condenser outflow connection through which the compressed fluid is passed for reducing the pressure on the fluid, and evaporator structure having an inlet connected to the pressure reducing means and an outlet connected to the compressor inlet for receiving the fluid as its pressure is reduced, automatically permitting it to evaporate and absorb heat and then recycling the fluid for further compression; said evaporator structure being in heat exchange relation with said liquid discharge arrangement for absorbing heat from the liquid discharged after use of the hot water and utilizing any residual heat content of this liquid said compressor being mounted in heat exchange relation to the water in said container for supplying thereto heat produced by the operation of said compressor; said fluid circulating system including thermal storage means having a heat storage fluid in heat exchange relation with the liquified refrigerant fluid flowing from said condenser toward said evaporator structure.

3. In a heat pump system for supplying heated water: a water heater including a container connected to a water supply for holding heated water; an apparatus having heated water inlet means connected to the water heater for utilizing the heated water and having a liquid discharge arrangement through which the water is discharged after use; a refrigerant fluid circulating system comprising a fluid compressor means, fluid condenser means, fluid pressure reducing means and fluid evaporator means serially connected into an endless fluid circulating system, arranged to pass the refrigerant fluid successively through said compressor means, said condenser means, said pressure reducing means, and said evaporator means and to return said fluid back to said compressor means; said compressor operating to compress the fluid passing therethrough and including a compressor mounted in heat exchange relation with the water of said container for supplying thereto heat produced by the operation of said compressor means; said condenser means including a condenser structure mounted in heat exchange with the water in said container for causing compressed fluid passing therethrough to liquify and deliver heat to the water of said container; said pressure reducing means being operative to reduce the pressure of compressed fluid passing therethrough; said evaporator means including an evaporator structure in heat exchange relation with the liquid of said discharge arrangement for permitting fluid passing through said evaporator structure to evaporate and absorb heat from the liquid discharged after use of the hot water and utilizing any residual heat content from said liquid; and means responsive to the temperature of the water in said container for setting said compressor into operation when the water temperature is below a predetermined level and for stopping the operation of said compressor when the water temperature is above a predetermined level; the evaporator structure including auxiliary evaporator means arranged to be selectively connected to said fluid circulating system in heat exchange relation with auxiliary heat sources for supplying heat to the refrigerant fluid, and means responsive to the temperature of the discharged water for connecting said auxiliary evaporator means to said circulating system when the temperature of the discharged water is below a predetermined level, and for disconnecting said auxiliary evaporator means from said circulating system when the temperature of the discharged water is above a predetermined level.

4. A heat pump system as defined by claim 3 in which the auxiliary heat sources include a heat transfer apparatus arranged for heat transfer between ambient air and the auxiliary evaporator means.

5. In a heat pump system for supplying heated water: a water heater including a container connected to a water supply for holding heated water; an apparatus having heated water inlet means connected to the water heater for utilizing the heated water and having a liquid discharge arrangement through which the water is discharged after use; a refrigerant fluid circulating system comprising a fluid compressor means, fluid condenser means, fluid pressure reducing means and fluid evaporator means serially connected into an endless fluid circulating system arranged to pass the refrigerant fluid successively through said compressor means, said condenser means, said pressure reducing means, and said evaporator means and to return said fluid back to said compressor means; said compressor operating to compress the fluid passing therethrough and including a compressor mounted in heat exchange relation with the water of said container for supplying thereto heat produced by the operation of said compressor means; said condenser means including a condenser structure mounted in heat exchange with the water in said container for causing compressed fluid passing therethrough to liquify and deliver heat to the water of said container; said pressure reducing means being operative to reduce the pressure of compressed fluid passing therethrough; said evaporator means including an evaporator structure in heat exchange relation with the liquid of said discharge arrangement for permitting fluid passing through said evaporator structure to evaporate and absorb heat from the liquid discharged after use of the hot water and utilizing any residual heat content from said liquid; and means responsive to the temperature of the water in said container for setting said compressor into operation when the water temperature is below a predetermined level and for stopping the operation of said compressor when the water temperature is above a predetermined level; the evaporator structure including parallel connected auxiliary evaporator means in heat exchange relation with auxiliary heat sources for supplying heat to the refrigerant fluid when insufficient heat is available at the liquid discharge arrangement; and control elements connected to the condenser outflow connection to selectively provide refrigerant flow through the auxiliary heat sources.

6. In a heat pump system for supplying heated liquid for use in apparatus having a discharge structure into which the liquid containing residual heat is discharged after use; a container for holding liquid to be heated before discharge into said discharge structure; endless conduit cycle means holding and circulating a refrigerant fluid; said conduit cycle means including compressing means for increasing the pressure of said fluid along a portion of said conduit cycle means, condensing means for receiving the compressed fluid and permitting it to liquify and to supply rejected heat to the liquid in said container, pressure reducing means for reducing the pressure of the compressed liquified fluid, and evaporator means permitting the liquified fluid to evaporate and absorb heat and permitting the evaporated fluid to return to said compressing means; said compressing means having a compressor structure mounted in heat exchange relation with the liquid in said container for supplying thereto the heat produced by the operation of said compressor structure; said evaporator means being in heat exchange relation with said liquid discharge structure for absorbing and utilizing the residual heat content of the discharged liquid and for increasing the heating efficiency of said system; and means responsive to the temperature of the liquid in said container for setting said compressor structure into operation when the temperature of the liquid is below a predetermined level and for stopping the operation of said compressor structure when the temperature of said liquid is above a predetermined level.

7. In a heat pump system for supplying heated liquid for use in apparatus having a discharge structure into which the liquid containing residual heat is discharged after use: a container for holding liquid to be heated before discharge into said discharge structure; endless conduit cycle means holding and circulating a refrigerant fluid; said conduit cycle means including compressing means for increasing the pressure of said fluid along a portion of said conduit cycle means, condensing means for receiving the compressed fluid and permitting it to liquify and to supply rejected heat to said liquid, pressure reducing means for reducing the pressure of the compressed liquified fluid, and evaporator means permitting the liquified fluid to evaporate and absorb heat from said liquid and permitting the evaporated fluid to return to said compressing means; said compressing means having a compressor structure mounted in heat exchange relation with the liquid in said container for supplying thereto the heat produced by the operation of said compressor structure; said evaporator means being in heat exchange relation with said liquid discharge structure for absorbing and utilizing the residual heat content of the discharged liquid and for increasing the heating efficiency of said system; and means responsive to the temperature of the liquid in said container for setting said compressor structure into operation when the temperature of the liquid is below a predetermined level and for stopping the operation of said compressor structure when the temperature of said liquid is above a predetermined level; said system including a heated liquid holding structure in heat transfer association with portions of the conduit cycle means including the compressing means and condensing means.

8. In a heat pump system for supplying heated liquid for use in apparatus having a discharge structure into which the liquid containing residual heat is discharged after use: a container for holding liquid to be heated before discharge into said discharge structure; endless conduit cycle means holding and circulating a refrigerant fluid; said conduit cycle means including compressing means for increasing the pressure of said fluid along a portion of said conduit cycle means, condensing means for receiving the compressed fluid and permitting it to liquify and to supply rejected heat to said liquid, pressure reducing means for reducing the pressure of the compressed liquified fluid, and evaporator means permitting the liquified fluid to evaporate and absorb heat from said liquid and permitting the evaporated fluid to return to said compressing means; said compressing means having a compressor structure mounted in heat exchange relation with the liquid in said container for supplying thereto the heat produced by the operation of said compressor structure; said evaporator means being in heat exchange relation with said liquid discharge structure for absorbing and utilizing the residual heat content of the discharged liquid and for increasing the heating efficiency of said system; and means responsive to the temperature of the liquid in said container for setting said compressor structure into operation when the temperature of the liquid is below a predetermined level and for stopping the operation of said compressor structure when the temperature of said liquid is above a predetermined level; said system including a heated liquid holding structure and heating control elements connected for effecting a heating operation in response to the amount of heated liquid in the holding structure.

9. In a heat pump system for supplying heated liquid for use in apparatus having a discharge structure into which the liquid containing residual heat is discharged after use: a container for holding liquid to be heated before discharge into said discharge structure; endless conduit cycle means holding and circulating a refrigerant fluid; said conduit cycle means including compressing means for increasing the pressure of said fluid along a portion of said conduit cycle means, condensing means for receiving the compressed fluid and permitting it to liquify and to supply rejected heat to said liquid, pressure reducing means for reducing the pressure of the compressed liquified fluid, and evaporator means permitting the liquified fluid to evaporate and absorb heat from said liquid and permitting the evaporated fluid to return to said compressing means; said compressing means having a compressor structure mounted in heat exchange relation with the liquid in said container for supplying thereto the heat produced by the operation of said compressor structure; said evaporator means being in heat exchange relation with said liquid discharge structure for absorbing and utilizing the residual heat content of the discharged liquid and for increasing the heating efficiency of said system; and means responsive to the temperature of the liquid in said container for setting said compressor structure into operation when the temperature of the liquid is below a predetermined level and for stopping the operation of said compressor structure when the temperature of said liquid is above a predetermined level; said system including a heated liquid holding structure and heating control elements connected for effecting a heating operation in response to the presence of residual heat containing liquid in said discharge structure.

10. In a heat pump system for supplying heated liquid for use in apparatus having a discharge structure into which the liquid containing residual heat is discharged after use: a container for holding liquid to be heated before discharge into said discharge structure; endless conduit cycle means holding and circulating a refrigerant fluid; said conduit cycle means including compressing means for increasing the pressure of said fluid along a portion of said conduit cycle means, condensing means for receiving the compressed fluid and permitting it to liquify and to supply rejected heat to said liquid, pressure reducing means for reducing the pressure of the compressed liquified fluid, and evaporator means permitting the liquified fluid to evaporate and absorb heat from said liquid and permitting the evaporated fluid to return to said compressing means; said compressing means having a compressor structure mounted in heat exchange relation with the liquid in said container for supplying thereto the heat produced by the operation of said compressor structure; said evaporator means being in heat exchange relation with said liquid discharge structure for absorbing and utilizing the residual heat content of the discharged liquid and for increasing the heating efficiency of said system; and means responsive to the temperature of the liquid in said container for setting said compressor structure into operation when the temperature of the liquid is below a predetermined level and for stopping the operation of said compressor structure when the temperature of said liquid is above a predetermined level; said system including a heated liquid holding structure and heating control elements connected for effecting a heating operation in response to the amount of heated liquid in the holding structure, and to the presence of residual heat containing liquid in said discharge structure.

11. In a heat pump system for supplying heated liquid for use in apparatus having a discharge structure into which the liquid containing residual heat is discharged after use: a container for holding liquid to be heated before discharge into said discharge structure; endless conduit cycle means holding and circulating a refrigerant fluid; said conduit cycle means including compressing means for increasing the pressure of said fluid along a portion of said conduit cycle means, condensing means for receiving the compressed fluid and permitting it to liquefy and to supply rejected heat to said liquid, pressure reducing means for reducing the pressure of the compressed liquefied fluid, and evaporator means permitting the liquefied fluid to evaporate and absorb heat from said liquid and permitting the evaporated fluid to return to said compressing means; said compressing means having a compressor structure mounted in heat exchange relation with the liquid in said container for supplying thereto the heat produced by the operation of said compressor structure; said evaporator means being in heat exchange relation with said liquid discharge structure for absorbing and utilizing the residual heat content of the discharged liquid and for increasing the heating efficiency of said system; and means responsive to the temperature of the liquid in said container for setting said compressor structure into operation when the temperature of the liquid is below a predetermined level and for stopping the operation of said compressor structure when the temperature of said liquid is above a predetermined level; said condensing means being held in a liquid container having a pair of detachable liquid carrying connectors with which it is connected to a heated liquid reservoir of a heated liquid supply system for supplying heat to liquid in the reservoir.

12. In a system for supplying heated liquid to utilizing means in which heated liquid is used; a liquid container for holding liquid to be supplied to the utilizing means; a liquid discharge element through which liquid flowing from said utilizing means is discharged after use; a heat pump system comprising fluid compressor means, fluid condenser means, fluid pressure-reducing means, and fluid evaporator means serially connected to constitute an endless fluid-circulating system arranged to pass a refrigerant fluid successively through said compressor means, said condenser means, said pressure-reducing means and said evaporator means and back to said compressor means; said condenser being in heat exchange relation with the liquid in said container for transferring heat from said fluid to said liquid; and means responsive to the temperature of the liquid in said container for setting said compressor means into operation when the temperature of said liquid is below a predetermined level and for stopping the operation of said compressor means when the temperature of said liquid is above a predetermined level operative to compress said passing fluid in said compressor means, and to permit to condense said fluid in said condenser means and to cause the pressure of said fluid to be reduced in said pressure reducing means and to permit said fluid to evaporate and absorb heat in said evaporator means; said compressing means having a compressor structure mounted in heat exchange relation with the liquid in said container for supplying thereto heat produced by the operation of said compressor structure; said evaporator means being at least partly in heat-exchange relation with said liquid-discharge elements for causing fluid passing there through to evaporate and absorb heat present in the liquid flowing through said discharge elements so that at least part of the heat of the liquid discharged through said discharge elements is delivered through said evaporator means to the fluid passing into said compressor means.

13. In a system for supplying heated liquid to utilizing means in which heated liquid is used: a liquid container for holding liquid to be supplied to said utilizing means; liquid discharge elements through which liquid flowing from said utilizing means is discharged after use; a heat pump system comprising fluid compressor means, fluid condenser means, fluid pressure reducing means, and fluid evaporator means, serially connected into an endless fluid circulating system arranged to pass a refrigerant fluid successively through said compressor means, said condenser means, said pressure reducing means and said evaporator means and return said fluid back to said compressor means; said system being operated to compress said passing fluid in said compressor means, and to permit said fluid to condense in said condenser means and to cause the pressure of said compressed fluid to be reduced in said pressure reducing means and to permit said fluid to evaporate and absorb heat in said evaporator means; said compressing means having a compressor structure mounted in heat exchange relation with the liquid in said container for supplying thereto heat produced by the operation of said compressor structure; said evaporator means being at least partly in heat exchange relation with said liquid discharge elements for causing fluid passing through said evaporator means to evaporate and absorb heat present in liquid flowing through said discharge elements to that at least part of the heat of liquid discharged through said discharge elements is delivered through said evaporator means to the fluid passing into said compressor means; said condenser means being in heat exchange relation with the liquid in said container for transferring heat from said fluid to said liquid; said system including thermal storage means having a heat storage fluid in heat exchange relation with the liquified refrigerant fluid flowing from said condenser means toward said evaporator means.

14. In a system for supplying heated liquid to utilizing means in which heated liquid is used: a liquid container for holding liquid to be supplied to said utilizing means; liquid discharge elements through which liquid flowing from said utilizing means is discharged after use; a heat pump system comprising fluid compressor means, fluid condenser means, fluid pressure reducing means, and fluid evaporator means, serially connected into an endless fluid circulating system arranged to pass a refrigerant fluid successively through said compressor means, said condenser means, said pressure reducing means and said evaporator means and return said fluid back to said compressor means; said system being operated to compress said passing fluid in said compressor means, and to permit said fluid to condense in said condenser means and to cause the pressure of said compressed fluid to be reduced in said pressure reducing means and to permit said fluid to evaporate and absorb heat in said evaporator means; said compressing means having a compressor structure mounted in heat exchange relation with the liquid in said container for supplying thereto heat produced by the operation of said compressor structure; said evaporator means being at least partly in heat exchange relation with said liquid discharge elements for causing fluid passing through said evaporator means to evaporate and absorb heat present in liquid flowing through said discharge elements so that at least part of the heat of liquid discharged through said discharge elements is delivered through said evaporator means to the fluid passing into said compressor means; said condenser means being in heat exchange relation with the liquid in said container for transferring heat from said fluid to said liquid; said system including thermal storage means having a heat storage fluid in heat exchange relation with the liquefied refrigerant fluid flowing from said condenser means toward said evaporator means, and control means operative to cause liquified refrigerant fluid to absorb heat from said heat storage fluid when the temperature of the liquid discharged through said discharge elements is below a predetermined level.

EUGENE RUSSELL AMBROSE.
PHILIP SPORN.

REFERENCES CITED

The following references are of record in the file of this patent:

UNITED STATES PATENTS

| Number | Name | Date |
| --- | --- | --- |
| 1,874,803 | Reed | Aug. 30, 1932 |
| 1,935,281 | Reed | Nov. 14, 1933 |
| 2,042,812 | Tull | June 2, 1936 |
| 2,162,245 | Comstock | June 13, 1939 |
| 2,375,157 | Wilkes | May 1, 1945 |

FOREIGN PATENTS

| Number | Country | Date |
| --- | --- | --- |
| 487,762 | France | July 24, 1918 |